United States Patent [19]

Blaushild

[11] Patent Number: 4,714,228

[45] Date of Patent: Dec. 22, 1987

[54] SELF-ADJUSTABLE SUPPLEMENTAL SUPPORT SYSTEM FOR A CYLINDRICAL CONTAINER IN A HOUSING

[75] Inventor: Ronald M. Blaushild, Wilkinsburg, Pa.

[73] Assignee: The United States of America as represented by the United States Department of Energy, Washington, D.C.

[21] Appl. No.: 10,505

[22] Filed: Jan. 30, 1987

[51] Int. Cl.[4] .......... F16M 13/00

[52] U.S. Cl. .......... 248/608; 206/583

[58] Field of Search .......... 248/608, 146, 154, 311.2, 248/313; 206/446, 583, 591, 592, 806; 220/400, 470, 18; 410/47

[56] References Cited

U.S. PATENT DOCUMENTS

| | | | |
|---|---|---|---|
| 2,674,370 | 4/1954 | Iredell | 206/583 X |
| 2,779,464 | 1/1957 | Cairnes et al. | 206/583 |
| 2,817,435 | 12/1957 | Butterfield | 206/583 |
| 2,932,546 | 4/1960 | Marggraf | 206/583 X |
| 3,265,200 | 8/1966 | Omer | 206/592 X |
| 3,357,589 | 12/1967 | Spaulding et al. | 206/583 X |
| 3,888,346 | 6/1975 | Lancaster | 206/592 X |
| 4,013,170 | 3/1977 | Hutterer | 206/583 X |
| 4,574,955 | 3/1986 | Camossi | 206/583 |

*Primary Examiner*—J. Franklin Foss

*Attorney, Agent, or Firm*—Daniel C. Abeles

[57] ABSTRACT

A self-adjustable supplementary support system for a cylindrical container coaxially disposed in a cylindrical housing by upper flanged supports has a plurality of outwardly extending bracket units on the external surface of the container which coact with inwardly extending resiliently outwardly extending bracket units on the inner wall of the cylindrical housing. The bracket units have flanges which form a concave surface that seats on support bars, attached by links to torsion bars that are secured to ring segments annularly spaced about the inner wall of the cylindrical housing and the bracket units and support bars coact with each other to radially position and support the container in the housing during movement of the two components from a vertical to a horizontal position, and during transportation of the same.

9 Claims, 14 Drawing Figures

SELF-ADJUSTABLE SUPPLEMENTAL SUPPORT SYSTEM FOR A CYLINDRICAL CONTAINER IN A HOUSING

The present invention was made under government contract NPD 84-3820-AX and relates to a supplemental support system for a cylindrical container within a cylindrical housing during movement of the housing containing the container from a vertical to a horizontal position.

In instances where cylindrical containers, such as cylindrical shell type nuclear reactor components, which have an outwardly extending flange about the upper portion thereof, are to be transported, the container is placed in a cylindrical housing that has an inwardly directed flange thereon, with the flange of the container resting on the flange of the housing to support the container within, and spaced from the inner surface of, the housing. The container is vertically loaded into the housing with the flange of the container resting on the flange of the housing. During transport, however, the housing with the container therein is often pivoted to a horizontal position, which can cause stresses on the container walls and possible distortions thereof due to the cantilevered support of the container in the housing through the upper flange supporting means. Such distortions may change the positioning of the components in the cylindrical container which could lead to problems. During a change from vertical to horizontal position, the contact of the entire container support flange with the housing support flange may be also disrupted, which is disadvantageous to secure positioning of the container within the housing.

A problem exists in that the inner area of the housing is inaccessible once the container is disposed therein, such that placement of a carefully located rigid supplemental support within the housing between the container and housing walls is not possible. Thus, a need exists for a supplemental support system for such a container within a housing that is self-adjusting so as to provide a secure coaxial positioning of the container in the housing during movement from a vertical loading position to a horizontal transport position so as to prevent stresses on the container.

SUMMARY OF THE INVENTION

A supplemental supporting system, which is self-adjustable so as to maintain a cylindrical container coaxially aligned within the confines of a cylindrical housing, has a plurality of radially outwardly extending bracket units that are secured to a support ring about the container, which coact with confronting resiliently outwardly extending bracket units on a cylindrical housing that use torsional forces to support the same. The container has an outwardly extending flange about the upper region thereof which rests on an inwardly directed flange on the housing to provide the primary support of the container therein, with the supplemental support means coaxially disposing the container in the housing during movement of the housing, containing the container, from a vertical to a horizontal position so as to relieve stresses on the container flange and prevent distortions of the container inside the housing during such movement.

The bracket units preferably have vertically and horizontally extending flanges thereon which have a concave outer surface, with four such bracket units provided equally spaced about the periphery of the outer surface of the container. Four confronting support bars on the supporting bar units are also preferably provided, with the support bars attached to inwardly and upwardly extending links attached to confronting ends of a pair of anchored annularly positioned torsion bars. The torsion bars are secured together within support blocks that are disposed between pairs of ring segments, with the ends of the torsion bars not attached together being secured to a ring segment, with the ring segments secured to the inner surface of the cylindrical housing.

The concave surface of the bracket flanges is seated on the support bar and prevents radial movement of the cylindrical container within the cylindrical housing so as to coaxially position the container during movement of the two components from a vertical to a horizontal position.

DETAILED DESCRIPTION

Figure 1:
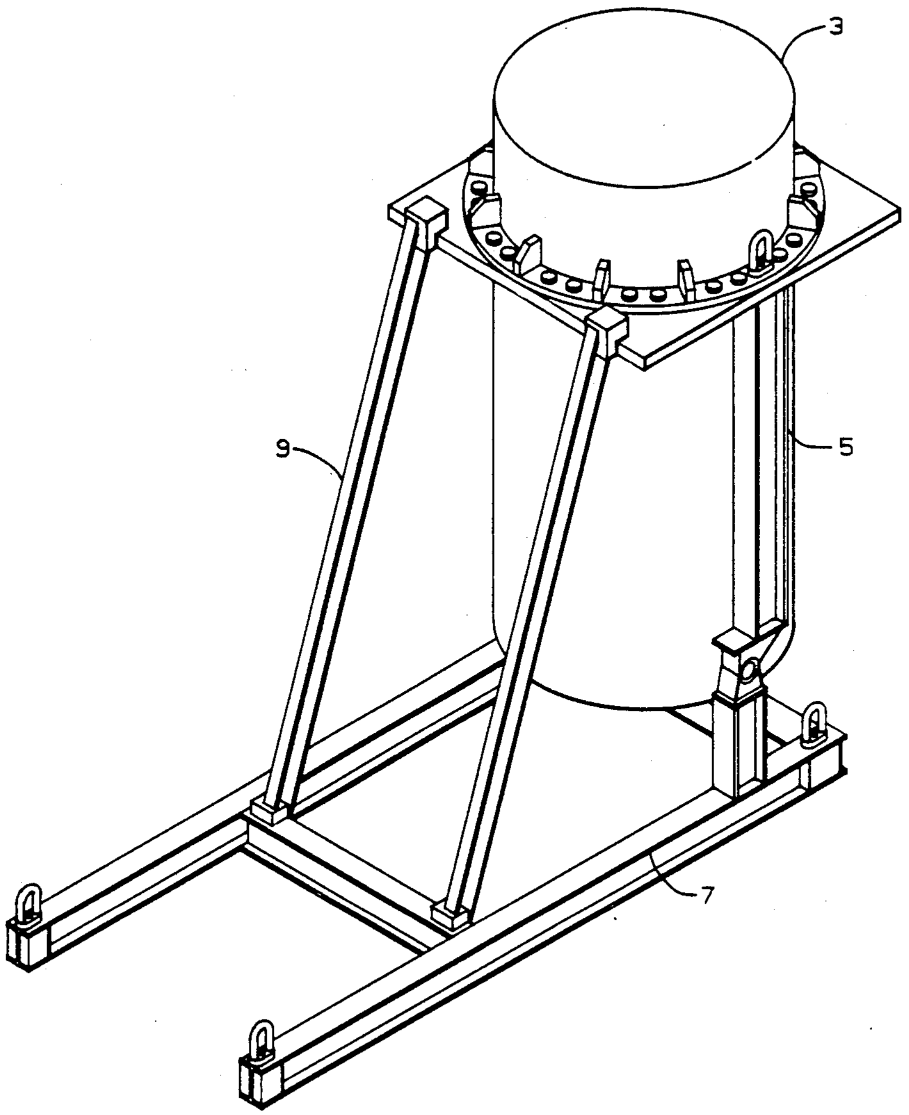
FIG. 1 is a perspective view of a cylindrical housing which contains a cylindrical container, in a vertical position, to which the present self-adjustable supplemental supporting system is directed.
Figure 2:
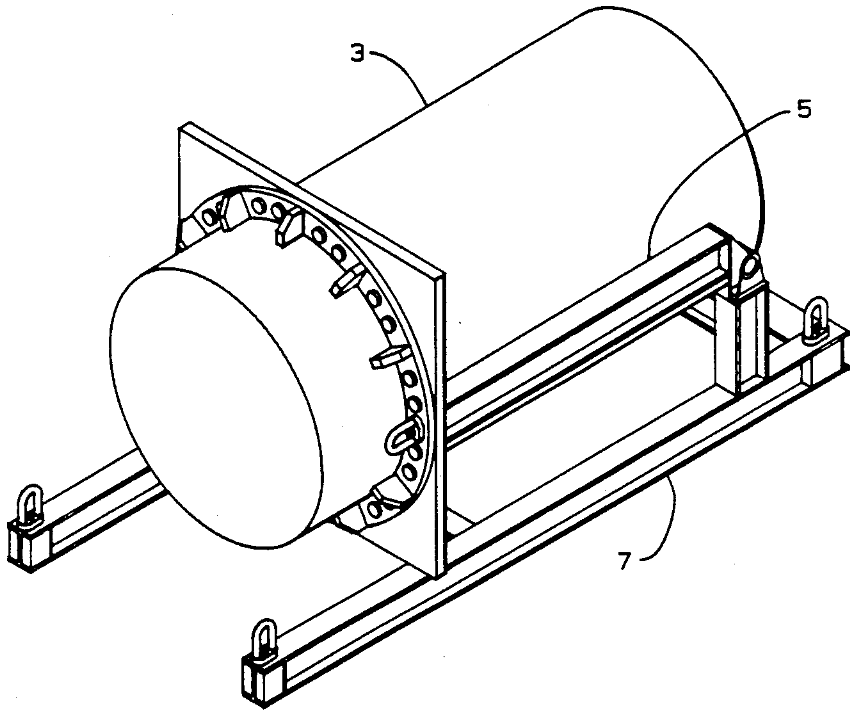
FIG. 2 is a perspective view similar to FIG. 1, illustrating the cylindrical housing containing a cylindrical container in horizontal position.

A perspective view of a container for which the present self-adjustable supporting system 1 is designed is illustrated in FIGS. 1 and 2. As shown, a cylindrical housing 3 is adapted for transfer from a vertical loading position (FIG. 1) to a horizontal transport position (FIG. 2), preferably with the use of a pivoting means, such as pivot arms 5 that are attached to support rails 7, and guide members 9 movable on the rails 7. The actual pivot means used and the guide members may vary, provided they are capable of controllably moving the housing 3 from a vertical position to a horizontal position, as indicated by the arrow in FIG. 3.

Figure 3:
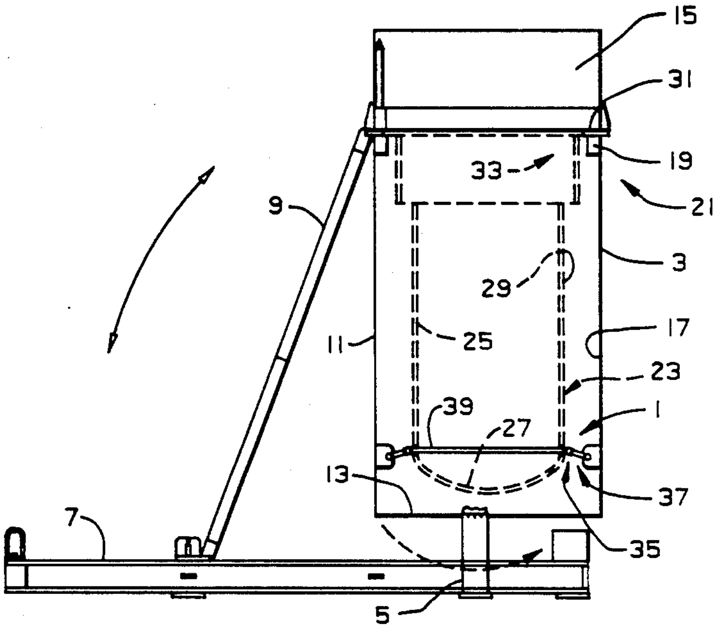
FIG. 3 is a partial vertical cross-sectional view through the cylindrical housing and cylindrical container showing placement of the self-adjusting supplemental supporting system of the present invention.

Referring now to FIG. 3, the cylindrical housing 3 has side walls 11 and bottom 13, with a removable top 15, the walls 11 having an inner surface 17 that has an inwardly directed support flange 19 about the upper region 21 thereof, and is adapted to axially support a cylindrical container 23 therein. The cylindrical container 23 has a wall 25 and bottom 27, the wall 25 having an external surface 29, the surface 29 having an outwardly extending flange 31 at the upper region 33 thereof. The outwardly extending flange 31 of the cylindrical container 23 rests on the inwardly directed support flange 19 of the cylindrical housing 3 such that the cylindrical container 23 is axially supported within the cylindrical housing 3 with the wall 25 in a spaced relation from the inner surface 17 of the walls 11 of the cylindrical housing 3 and the bottom 27 thereof spaced from the bottom 13 of the housing 3.

While the main support of the cylindrical container 23, when in vertical position, is the outwardly extending flange 31 which rests on the supported flange 19 of the cylindrical housing 3, the present self-adjustable supporting system 1 provides supplemental support at a vertical position, and when the cylindrical housing 3 and cylindrical container 23 are being transferred to horizontal position. When at horizontal position, the self-adjustable supporting system 1 maintains the cylindrical container 23 centrally axially positioned within the cylindrical housing 3 and relieves stresses and prevent distortions that would be placed on the cylindrical container 23 when in such a cantilevered position if supported solely by the outwardly extending flange 31 thereof.

Figure 5:
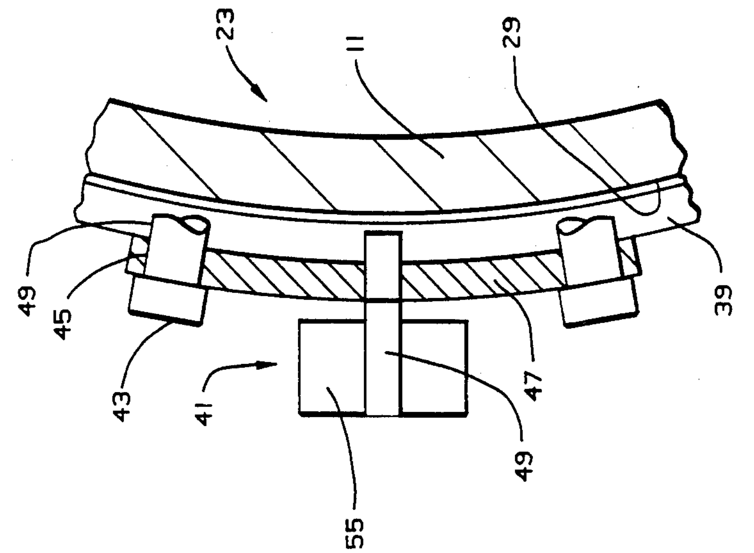
FIG. 5 is a view taken along lines 5—5 of FIG. 4.
Figure 4:
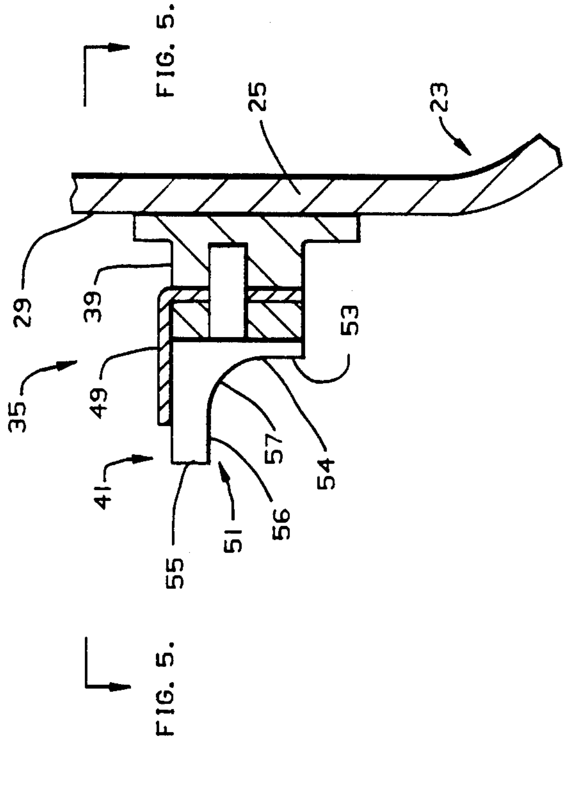
FIG. 4 is a vertical cross-sectional view of the cylindrical container wall showing the support ring and bracket secured thereto.

The self-adjusting supporting system 1 comprises bracket units 35 on the cylindrical container 23 and complementary resilient supporting bar units 37 on the cylindrical housing 3. The bracket units 35 (FIGS. 4 and 5) comprise a support ring 39 that is attached to the external surface 29 of the walls 25 of the cylindrical container 23, such as by welding or other means for attaching the ring, which support ring 39 extends around the cylindrical container 23. A plurality of radially outwardly extending brackets 41 are secured to the support ring 39, such as by bolts 43 extending through openings 45 in an annular base plate 47 of the bracket 41 and are threadedly secured in threaded bores 49 formed in the support ring 39. Preferably, four such brackets 41 are provided about the support ring 39, at 90° spaced intervals, only one of which is shown in FIG. 5. Extending outwardly from the annular base plate 47 is a support arm 49 that has secured thereto a bracket section 51 having a vertically extending flange 53 and a horizontally extending upper flange 55. The vertically extending flange 53 and horizontally extending flange 55 of the bracket section 51 converge on their outer surfaces to form a concave surface 57.

Figure 6:
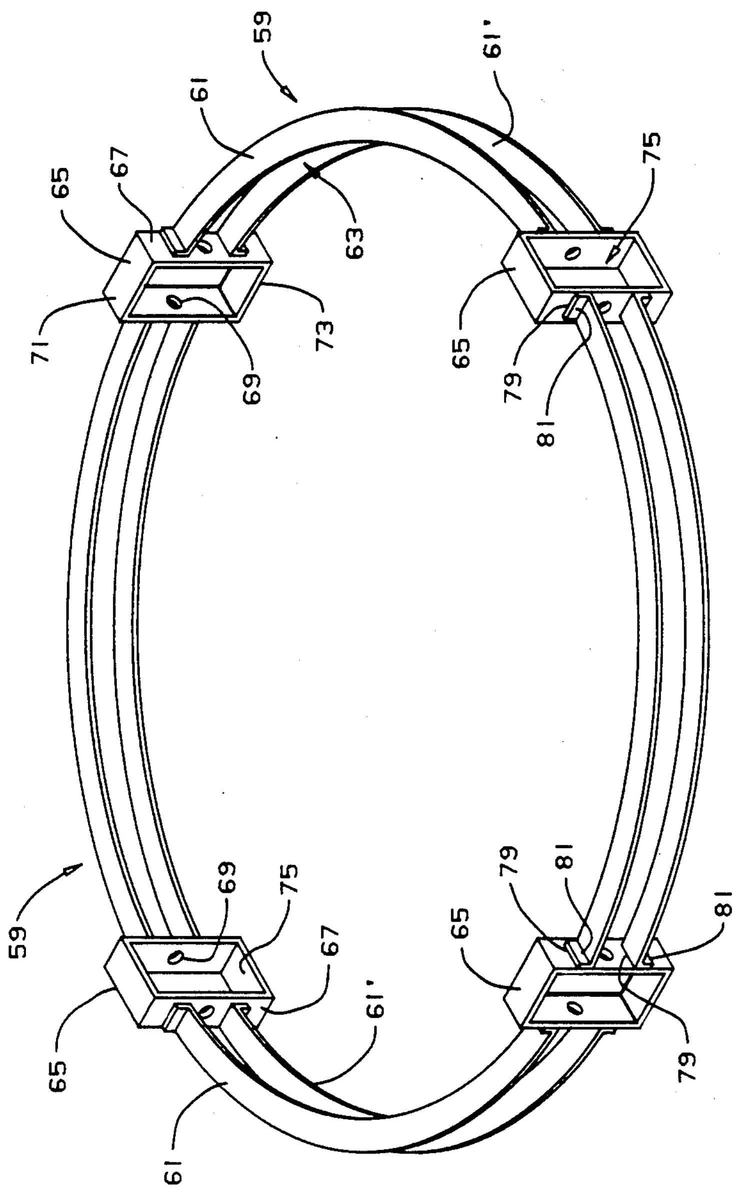
FIG. 6 is a schematic illustration of the spaced ring segments and support blocks which are to be affixed to the inner surface of the cylindrical housing.
Figure 7:
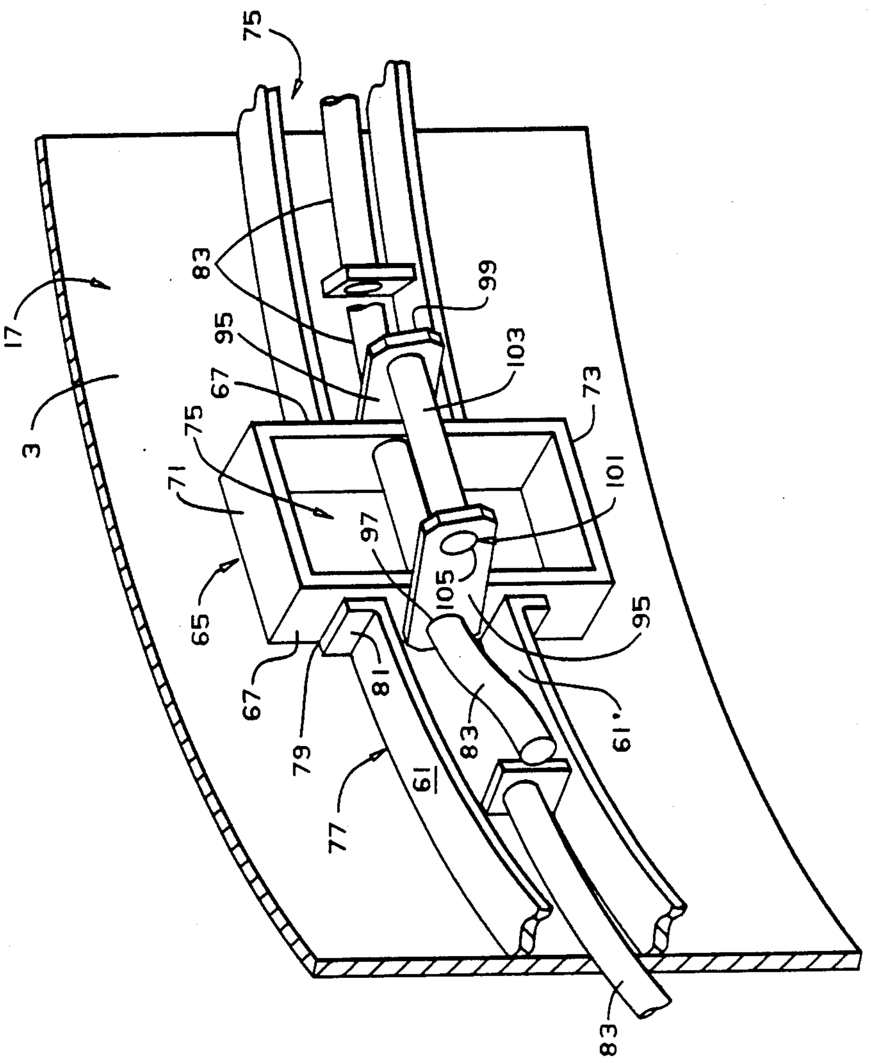
FIG. 7 illustrates a resilient supporting bar unit of the present invention secured to the inner surface of the cylindrical housing with the support bar attached to torsion bars.

The resilient supporting bar units 37 are secured to the inner surface 17 of the cylindrical housing 3. As illustrated in FIG. 6, a plurality of pairs 59 of annular spaced ring segments 61, 61' are provided which are secured to the inner surface 17 of the cylindrical housing 3, the ring segment 61 vertically spaced from confronting ring segment 61' to form a channel 63 therebetween. Disposed between adjacent pairs of ring segments 59 there is provided a support block 65 having side walls 67, each side wall having an aperture 69 therethrough, and top wall 71 and bottom wall 73 to form a box-like chamber 75. The ring segments 61 and 61' are secured to the inner surface 17 of the cylindrical housing 3, such as by welds 77, and the support blocks 65 are secured to adjacent pairs of ring segments such as by welds 79, which attach arms 81 of the ring segments to the walls 67 of the support blocks 65 (FIG. 7).

Figure 8:
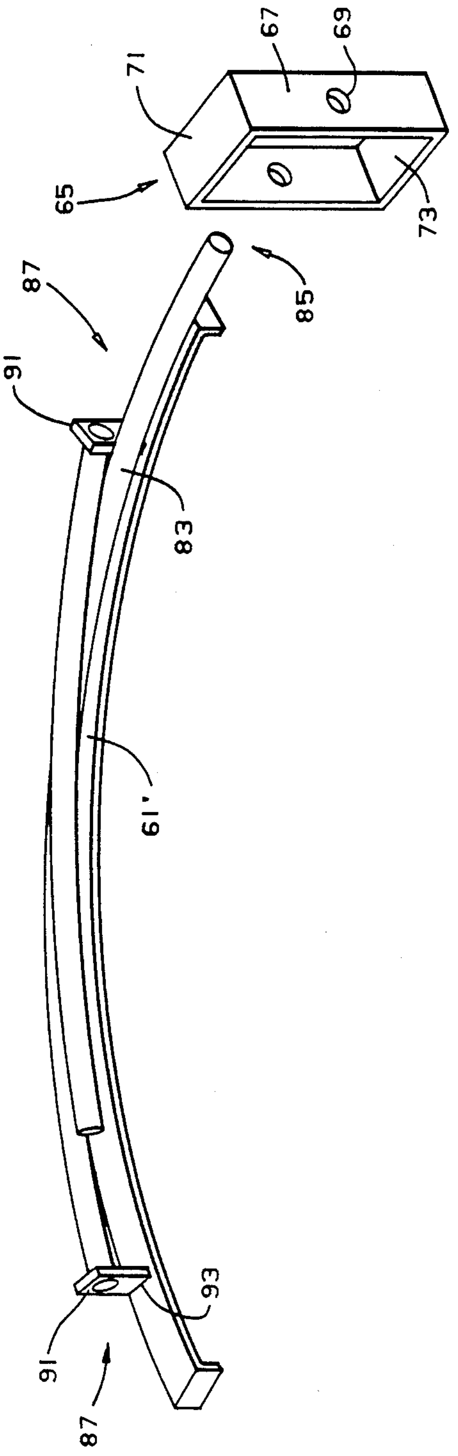
FIG. 8 is an exploded view showing the placement of the torsion bars and a ring segment relative to a support bar prior to securement thereto.
Figure 11:
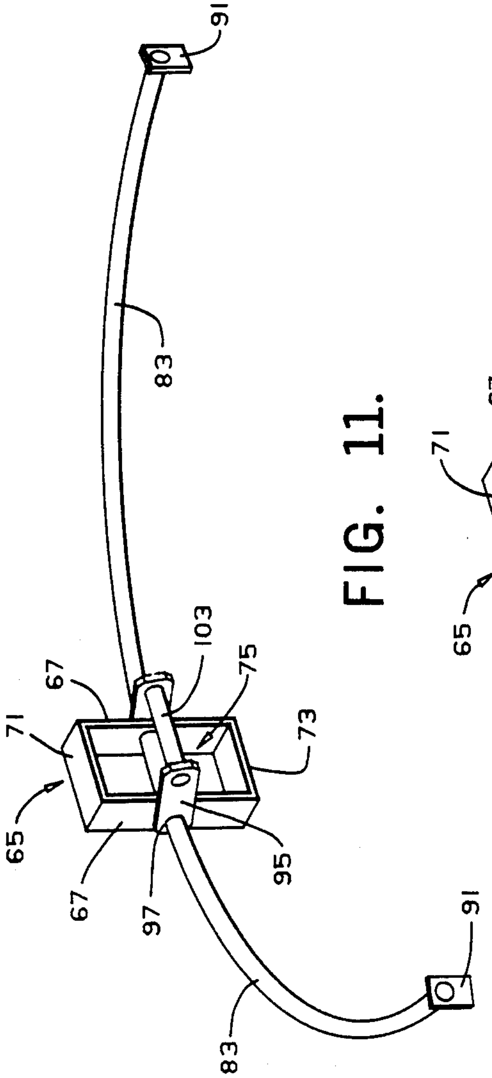
FIG. 11 is a schematic illustration showing adjacent torsion bars secured together within a support block and having the support links and support bar secured thereto.
Figure 12:
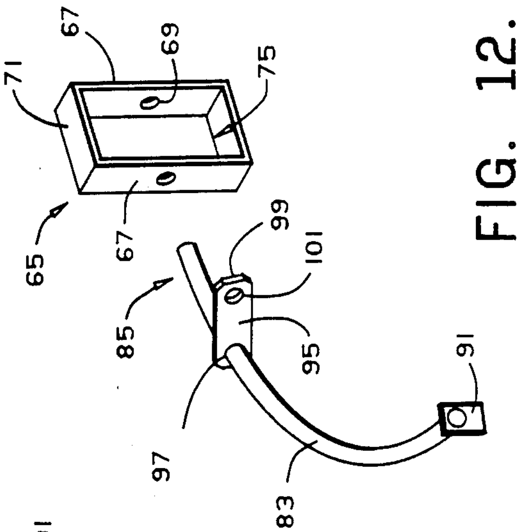
FIG. 12 is an exploded schematic view showing a torsion bar having an anchor and support link secured thereto prior to insertion of the free end through the aperture in the side wall of a support block.
Figure 10:
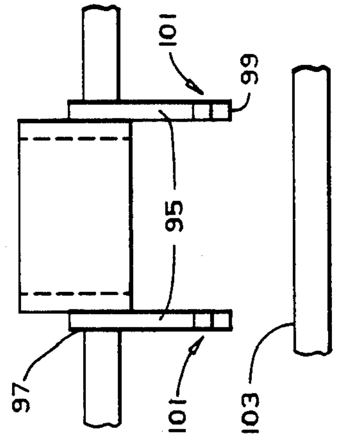
FIG. 10 is an exploded top view showing the support bar prior to securement to the support links.
Figure 9:
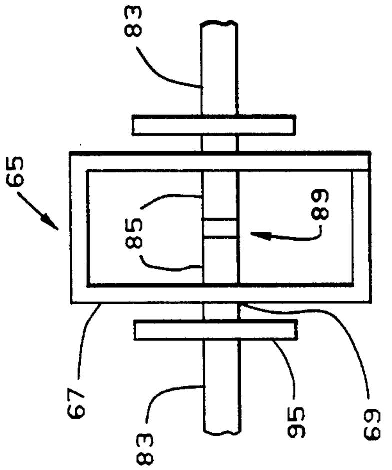
FIG. 9 is a schematic illustration showing the free ends of two adjacent torsion bars secured together within a support block, with the support links attached thereto.

A pair of torsion bars 83 are situated in the channel 63 between ring segments 61 and 61', each having a free end 85 and an anchored end 87, with the free ends 85 of each of an adjacent torsion bar of a pair of torsion bars extending through the aperture 69 in a side wall 67 of a support block 65, with the free ends of adjacent torsion bars secured together at 89, such as by welding, within the chamber 75 of the support block 65 (FIG. 9). The other end, or anchored end, 87 of each torsion bar 83 is secured, by means on an anchor brace 91 to a ring segment 61 or 61', which is welded to a respective ring segment as at 93 (FIG. 8). As shown, a confronting pair of torsion bars free ends 85 extend through apertures 69 in opposed walls 67 of a support block. Each channel 75 between vertically spaced ring segments 61 and 61' has therein two torsion bars 83, one of which is anchored therein and extends towards a support block 65 and the other of which is anchored therein and extends in the opposite direction to an adjacent support block 65 (FIG. 8).

Secured to each torsion bar 83, on opposite sides of a support block 65 is a radially upwardly and inwardly extending support link 95, a pair of such support links thus provided at each of the support blocks 65. The links 95 are secured to the torsion bars 83 at 97, such as by welding. The support links 95 have, adjacent their outer ends 99, apertures 101. A support bar 103 extends between the support links 95, and is secured in apertures 101, as at 105, by welding.

Figure 13:
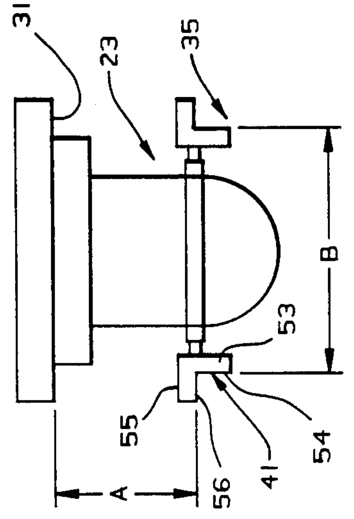
FIG. 13 is a schematic view showing the location of the bracket units on the external surface of a cylindrical container.

In assembly of the self-adjustable support system of the present invention, the cylindrical container 23 is provided with the support ring 39 thereabout, at a distance approximately the distance A (FIG. 13) on the external surface 29 thereof, spaced from the outwardly extending flange 31. The plurality of radially outwardly extending brackets 41 are then secured to the support ring, preferably four such brackets provided at equally spaced distances about the periphery of the cylindrical container, with the bottom surface 56 the horizontally extending flange 55 spaced a distance A from the outwardly extending flange 31, and the distance B between the outer surface 54 of opposite vertically extending flanges 53. The cylindrical container 23 is then ready for placement into the cylindrical housing 3.

Figure 14:
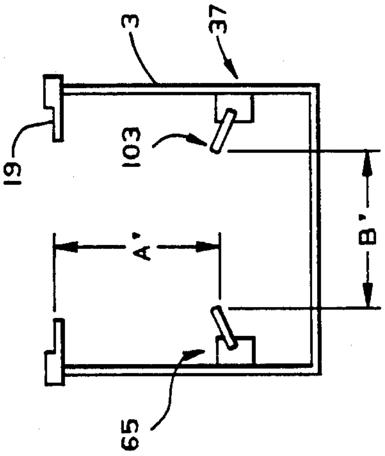
FIG. 14 is a schematic view showing the location of the resilient supporting bar units on the internal surface of the cylindrical housing.

In preparing the cylindrical housing 3, the pairs of ring segments 61 and 61' are welded to the inner surface 17 of the cylindrical housing with peripheral spaces between adjacent pairs of rings for insertion therebetween of support blocks 65. An anchor 91 is secured to a torsion bar 83 at one end and a support link 95 is secured adjacent the other or free end 85 of the torsion bar 83. A support block 65 is placed between adjacent pairs of ring segments, with arms 81 of the ring segments welded to the sides 67 of the support blocks 65. The anchor 91 is secured to a ring segment 61, spaced from a support block 65, such that the free end 85 of the torsion bar extends into the chamber 75 of the support block 65 through aperture 69. A second torsion bar 83, having a support link 95 and anchor 91, is similarly secured on the opposite side of the support block 65 with the free end 85 thereof extending through the opposed aperture 69 is the opposed wall 67. The confronting free ends 85 of the two torsion bars 83 are then welded together, and a support bar 103 secured in the apertures 101 in the two adjacent support links 95. Four such support bars 103 are preferably provided, equally spaced about the inner periphery of the cylindrical housing, such that they will be in confronting relationship to four brackets 41 attached to the support ring 39 on the cylindrical container 23. The assembly of the support bars is such that the bar, in rest position, will be a distance A' from the top of the inwardly extending flange 19 on the cylindrical housing 3, and opposed support bars spaced from each other a distance B' (FIG. 14). The distance A' is a distance that is slightly less than the distance A, while the distance B' is slightly larger than the distance B. For example, with the cylindrical container having an outer diameter of about 60" (152 cm), and a length of about 140" (356 cm), with the distance A equal to about 100" (254 cm) and the distance B equal to about 70" (178 cm), disposed in a cylindrical housing having an inner diameter of about 90" (229 cm), and a length of about 190" (483 cm), the distance A' would be about A−0.25 inch (0.64 cm), while the distance B' would be about B+0.5 inch (1.27 cm).

Upon placement of the cylindrical container 23 axially within the cylindrical housing 3, the main support is the resting of outwardly extending flange 31 on inwardly extending flange 19, but the bracket surfaces 56, 57 of brackets 41 will also be in contact with support bars 103, with the bars 103 torsioning the torsion bars through which they are linked, to provide a resilient supplemental support. The support bars are subject to pivotal movement when in contact with the concave surface of the brackets to lock the container in a secure coasial position within the housing. As the cylindrical housing 3 containing the cylindrical container 23 is moved from a vertical position towards a horizontal position, the supplemental support means, through bracket units 35 and resilient support bar units 37, maintain the cylindrical container 23 in central axial position within the cylindrical housing 3. The torsioned deformation of the support bars 103 provides a continuous contact between the support bar units 37 and the brackets 35 during pivoting of the enclosed container to the horizontal position, and also during transportation in both vertical and horizontal directions.

What is claimed is:

1. A self-adjustable supplemental supporting system for a cylindrical container having an external surface within a cylindrical housing having an inner surface, wherein the container has an outwardly extending flange at the upper region thereof resting on a radially inwardly directed complementary support flange about the upper region of the inner surface of the cylindrical housing and axially supporting the cylindrical container within the housing at a spaced relation from the inner surface and bottom of the housing, comprising:

a support ring attached to the external surface of the cylindrical container;

a plurality of radially outwardly extending bracket units secured to said support ring; and a plurality of resilient supporting bar units secured to the inner surface of said cylindrical housing in confronting relationship to said bracket units; such that the bracket units are seated on said resilient supporting bar units to prevent radial movement of the cylindrical container within the cylindrical housing.

2. The self-adjustable supplemental supporting system as defined in claim 1 wherein said bracket units comprise brackets having a vertically extending flange and a horizontally extending upper flange, with said flanges converging on their outer surfaces to form a concave surface.

3. The self-adjustable supplemental supporting system as defined in claim 2 wherein four said bracket units are provided, equally spaced about the periphery of the external surface of the cylindrical container.

4. The self-adjustable supplemental supporting system as defined in claim 3 wherein four said resilient supporting bar units are provided, one of each in confronting relationship to each of four said bracket units.

5. The self-adjustable supplemental supporting system as defined in claim 2 wherein each said resilient supporting bar unit comprise a support bar secured to radially inwardly and upwardly extending support links that are secured adjacent to the confronting ends of a pair of torsion bars.

6. The self-adjustable supplemental supporting system as defined in claim 5 wherein a hollow support block is secured to the inner surface of the cylindrical housing, the support block having side walls with apertures therethrough, with one of each of the pair of torsion bars passing through opposite apertures of the support block sidé walls and secured together therein, and the support links are secured to the torsion bars adjacently outside the support block.

7. The self-adjustable supplemental supporting system as defined in claim 6 wherein a pair of vertically spaced ring segments are provided between adjacent support blocks, and are secured to the inner wall of the cylindrical housing, to form a channel therebetween, and the torsion bars are disposed in said channel, with the end of each torsion bar not secured to an adjacent torsion bar being secured to one of said ring segments.

8. A self-adjustable supplemental supporting system for a cylindrical container having an external surface within a cylindrical housing having an inner surface, wherein the container has an outwardly extending flange at the upper region thereof resting on a radially inwardly directed complementary support flange about the upper region of the inner surface of the cylindrical housing and axially supporting the cylindrical container within the housing at a spaced relation from the inner surface and bottom of the housing, comprising:

a support ring attached to the external surface of the cylindrical container;

a plurality of radially outwardly extending brackets secured to said support ring, said brackets having a vertically extending flange and a horizontally extending upper flange, with said flanges converging on their outer surfaces to form a concave surface;

a plurality of annularly spaced pairs of vertically spaced ring segments secured to the inner surface of the cylindrical housing;

a plurality of hollow support blocks, a said support block disposed between adjacent pairs of said ring segments, the support blocks having side walls with apertures therethrough;

a pair of torsion bars disposed between each pair of ring segments, each having a free end and an anchored end, one of each of said pair of torsion bars anchored at said anchored end to a ring segment on opposite sides of a support block, with the free ends of confronting torsion bars extending through an aperture in the side wall of the support block and secured together within said support block;

a pair of radially inwardly and upwardly extending support links, one of each of which is secured to a torsion bar on opposite sides of a support block; and a support bar secured adjacent the ends of a pair of said links and extending therebetween, and disposed relative to a bracket on said cylindrical container such that the concave surface of said bracket is seated on said support bar, and prevents radial movement of said cylindrical container within said cylindrical housing.

9. A self-adjustable supplemental supporting system as defined in claim 8 wherein four said brackets are provided on the support ring equally spaced about the periphery of the external surface of the cylindrical container and four support bars are provided, one of which is in confronting relationship and engages each of said four brackets.

* * * * *